May 6, 1941.    J. C. HARRIS, JR., ET AL    2,240,618
POLYMERIZING APPARATUS
Filed July 9, 1936    2 Sheets-Sheet 2
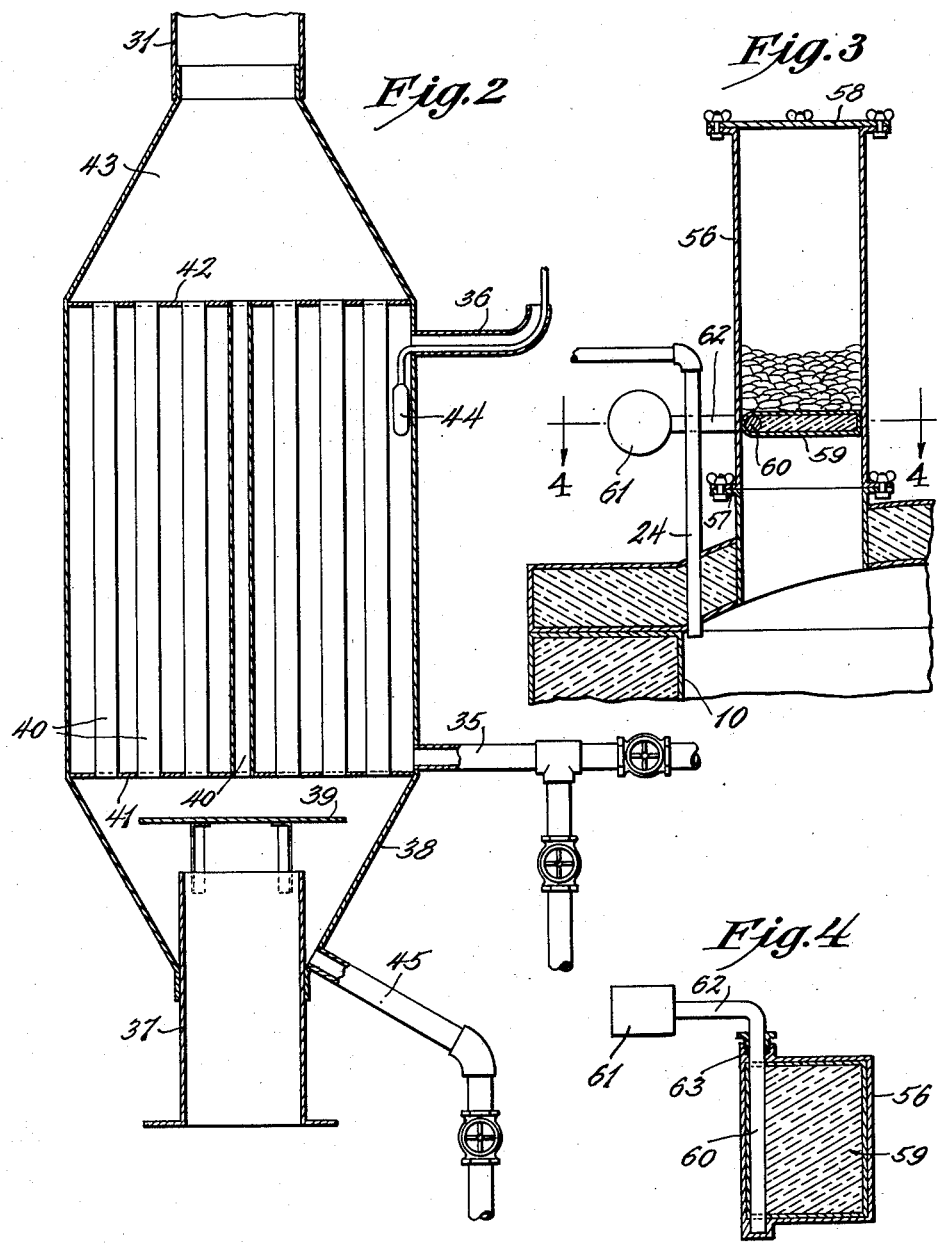
Inventor
J. C. Harris Jr. and
G. Sutherland
By A. D. Adams
Attorney Patented May 6, 1941

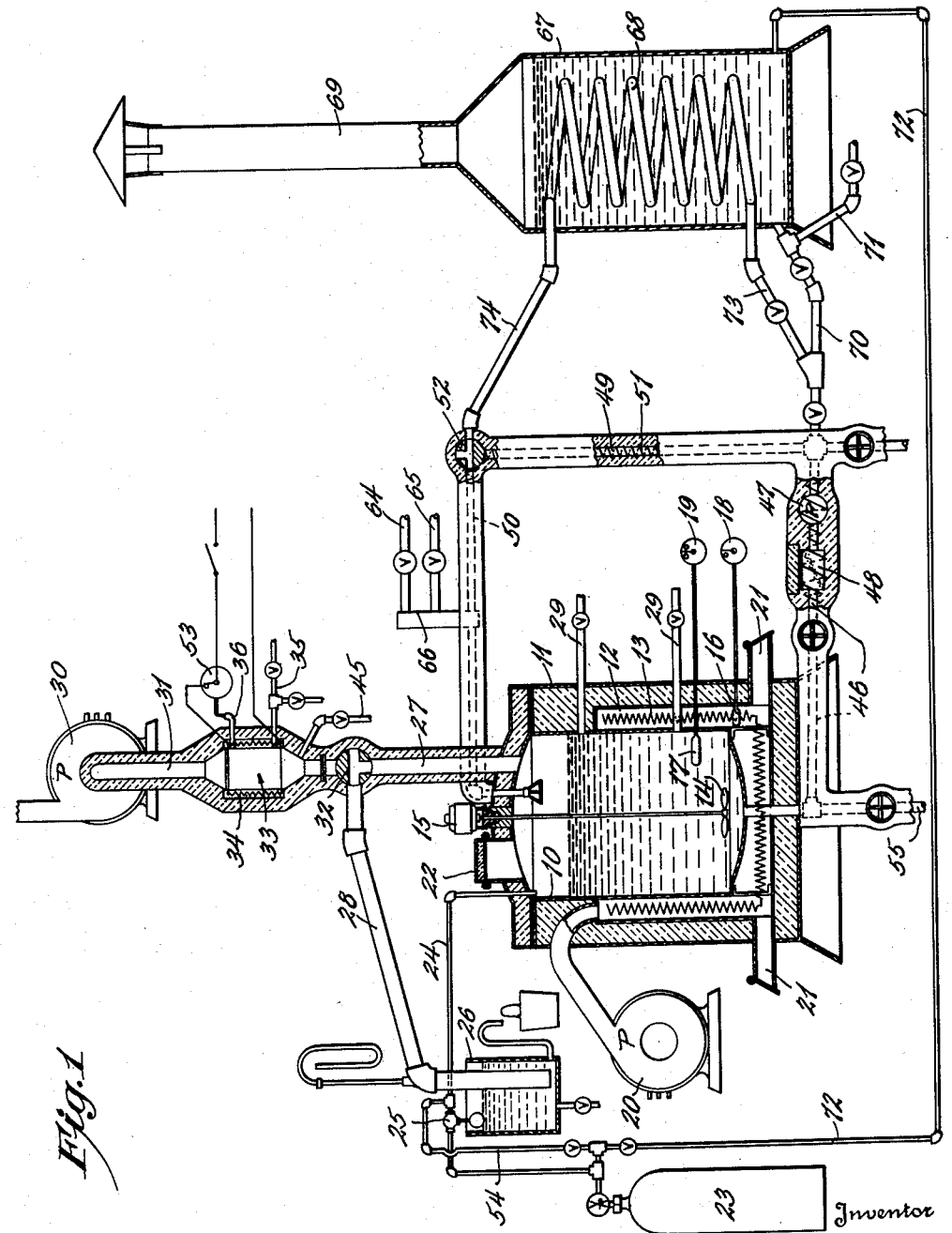

2,240,618

UNITED STATES PATENT OFFICE 2,240,618

POLYMERIZING APPARATUS

James C. Harris, Jr., and George Sutherland, Baltimore, Md.

Application July 9, 1936, Serial No. 89,839

4 Claims. (Cl. 23—285)

This invention relates to apparatus for polymerizing vegetable or animal oils which are capable of bodying or thickening by the application of heat and for making ester gum or other synthetic resins such as alkyd resins, phenolic resins and modifications of the same, including various kinds of varnishes. Among other objects, the invention aims to provide important improvements in apparatus of the type disclosed in our copending application Ser. No. 48,240 filed November 4, 1935, now Patent 2,118,728. One of the aims is to provide an exhauster or suction fan for removing some of the vapors or products of decomposition in suspension during the heat treatment in the kettle and a combined reflux condenser for reclaiming and/or returning some of the constituents of the vapor during the treatment of some products and also, for facilitating the removal of some of the undesirable constituents. For treating oils, the idea is to provide convenient means for reducing the acid number to the desired point as the polymerization progresses. For the treatment of gums or artificial resins and the like, the idea is to remove some of the products of the chemical reaction, such as water, and to condense and return the useful constituents in the vapor to the kettle. Another important aim of the invention is to provide a novel heat exchanger for preheating oil by exchange of heat with discharged oil from the polymerizer. A still further object is to provide a pump and strainer for removing impurities such as trash, dirt, pieces of wood and the like from a melted charge of rosin either alone or in combination with other ingredients. Other aims and advantages of the invention will appear in the specification, when considered in connection with the accompanaying drawings, wherein:

Fig. 1 is an assembly view of apparatus embodying the invention, parts being shown in section and other parts being shown in elevation;

Fig. 2 is a vertical sectional view showing the reflux condenser of Fig. 1 on an enlarged scale;

Fig. 3 is a fragmentary sectional view showing a gum charging chamber applied to the kettle; and Fig. 4 is a sectional view taken on the line 4—4 of Fig. 3.

Referring particularly to the drawings, the apparatus shown in Fig. 1 embodies the principal features shown in the aforesaid copending application, and includes the principal improvements thereon. There is shown a closed kettle 10 in an insulating jacket 11 providing a heating chamber 12, within which is arranged electrical resistance elements 13 for heating the kettle while the charge is stirred by an agitator 14 driven by a motor 15. The temperature in the heating chamber and the temperature of the charge are controlled by thermostats 16 and 17 operating thermal switches 18 and 19 respectively, the latter being a double switch to control the circuit to the electrical resistance elements and the circuit to the motor of a cooling fan 20 connected to blow air through the heating chamber around the kettle and discharge it through outlet conduits 21. The upper end of the kettle has a manhole opening which is adapted to be closed by a removable cover 22 so as to afford access to the interior of the kettle. When it is charged with a batch of oil or other material, carbon dioxide or other inert gas is adapted to be delivered to it above the level of the charge from a tank 23 through a pipe 24 having an automatic valve 25 controlled by the level of liquid in a chamber 26. While the heat treatment is progressing, especially in the treatment of oils as described in the aforesaid application, some of the vapors are adapted to be delivered from the kettle through a conduit 27 and branch 28 below the level of the liquid in the chamber 26.

The charge of inert gas or carbon dioxide maintains a slight pressure in excess of atmospheric pressure within the kettle when the impurities or vapors are delivered through the bleeder pipe or outlet conduit 28. If the pressure exceeds a predetermined amount, the liquid level will be caused to rise in the float chamber 26 and close the valve 25. If the pressure decreases, some of the liquid in the tank 26 will rise in the lower end of the pipe or conduit 28, causing the level to fall and thereby open the valve 25. Samples of the treated material may be taken from the kettle through the valved conduits 29. The method of treatment of oil and the like, using the apparatus thus far described, is explained fully in the aforesaid application.

To exhaust, at a slight vacuum, some of the vapors, such as steam or fatty acids from the kettle, depending upon the material being treated, there is shown a motor driven fan 30 connected by a conduit 31 to the outlet conduit 27 by means of a suitable two-way valve 32 adapted to be operated so that the conduit 27 may discharge through conduit 31. A reflux condenser 33 is connected between the two-way valve and the suction fan 30 in the conduit 31 and is shown as being adapted to be heated by an electical resistance 34 around the shell of the condenser. A cooling medium, such as water is adapted to be delivered to the condenser through a valved pipe 35 and a steam outlet pipe 36 is connected to the shell near the top.

Referring to Fig. 2, in which the condenser is shown on an enlarged scale, the vapors from the kettle enter it through the open upper end of a tubular extension 37 above the bottom of the lower header or chamber 38. A sheet metal baffle 39, which may be either flat or dome-shaped, is secured above the open end of the extension 37 to distribute the vapors more or less uniformly within the chamber and to drain condensate into the catcher or trap around the conduit 37. The vapors pass through tubes 40 connected to tube sheets 41 and 42, into the upper header or chamber 43 of the condenser. In some cases, desirable condensed constituents are returned to the kettle by filling the catcher and overflowing the upper end of the conduit 37. It will be understood that the water introduced into the condenser surrounds the tubes in the water space or chamber between the tube sheets 41 and 42. There is also shown a thermostat 44 in the water chamber conveniently inserted through the steam outlet conduit 36 and adapted to control the electrical circuit to the resistance elements which heat the condenser, as will be hereinafter explained. At the bottom portion of the lower header or chamber 38 which forms the condensate catcher or trap, there is shown a valved drain pipe 45. This drain pipe is adapted to be opened to drain out any condensate of vapors which are worth reclaiming, such as fatty acids, free glycerine or the like, and to prevent recontamination of the batch in the kettle.

To make ester gum, for example, a suitable charge of rosin and glycerine is introduced into the kettle. Carbon dioxide is also admitted to displace the air throughout the charge. The mass is first heated to a temperature of approximately 450° F. To remove any debris, such as pieces of wood, dirt and other foreign matter that may have been contained in the charge, the mass, when it has become sufficiently molten to flow, is pumped through an outlet conduit 46 by means of a pump 47 and passes through a suitable strainer 48 back into the kettle through pipes 49 and 50 connected to the top of the kettle, all of said pipes being preferably heated by an electrical resistance 51 to prevent the mass from cooling and clogging up the pipes. These pipes are also shown as being covered with heat insulating material. A two-way valve 52 is connected between the pipes 49 and 50 and a pipe leading from a heat exchanger hereinafter to be described.

The condenser 33 has previously been filled with water and heated to the boiling point by the heating elements 34 controlled by an ordinary hand switch as shown. The thermal switch 53 is set to open the circuit at a much higher temperature than the boiling point of water, as will hereinafter be explained. The agitator and the suction fan are both started, the valve 32 being turned so that the suction fan communicates with the kettle while the bleeder conduit 28 is closed. When this valve is so turned, the admission of carbon dioxide may be manually controlled by a hand valve in a pipe 54 which by-passes the automatic control valve 25. Now the suction fan maintains a pressure of about 2 inches mercury column less than atmospheric pressure, or about 13½ pounds, absolute. When the temperature of the mass exceeds about 450° F. and some vapors begin to pass through the condenser tubes, the circuit to the electrical resistance for the condenser may be cut off because the hot vapors will keep the water boiling. The steam produced as the chemical reaction progresses in the kettle will be discharged by the fan; while most of the free glycerine in suspension will be condensed by the condenser and returned to the kettle through conduit 37. The temperature in the kettle is raised to about 540° F. and is controlled by the two-point thermostatic switch 19. If it continues to rise, say, another 5°, the switch starts the cooling blower to bring the temperature back down to 540° F. If it falls below 540° F., the same switch will turn on the current again to apply more heat. This operation continues until the acid number of the charge is reduced to the desired point. This is determined by taking samples from one or both of the valved conduit 29.

After the acid number is reduced to the desired point, there usually remains some unreacted or free glycerine in the kettle. It is necessary to remove it and this is accomplished by allowing the water to drain out of the condenser 33 and further heating the condenser by means of the electrical resistance elements 34 under the control of the thermal switch 53, until the temperature within the condenser is approximately 560° F. or slightly above the temperature in the kettle. This permits the volatilized glycerine to pass out through the fan without condensing. Further tests of samples from the kettle are made to determine whether there is any free glycerine and the process is stopped when the presence of it is no longer indicated. Then the contents are ready to be drawn off through the electrically heated outlet pipe 46 and a valved outlet branch 55.

The apparatus thus far described is well adapted for use in manufacturing other synthetic resins such as alkyd resins and phenolic resin or modified phenolic resins. In making them, the exhauster or suction fan and condenser are employed for removing water vapor and some of the unreacted constituents of the treated products. In some instances, the unreacted constituents may be condensed and reclaimed from the catcher or trap of the condenser through the drain pipe 45 which is below the level of the upper end of the pipe 37.

In making some modified phenolic resins or varnishes, it is desirable to provide means for dumping the gum into the kettle after the contents have been initially heated to a high temperature. To this end, there is shown in Fig. 3 a dump chamber 56 having an annular flange 57 adapted to be bolted on the manhole flange in the place of the manhole cover 22. This chamber is shown as having a closure or cover 58 and a movable or dumping bottom in the form of a pivoted valve 59 which is conveniently made of heat insulating material covered with sheet metal to prevent the heat of the kettle from melting the gum in the chamber. This valve is mounted on a pivoted shaft 60 and is counterweighted by means of a weight 61 on an arm 62. The shaft projects through a stuffing box 63 at one side of the chamber to prevent vapors from escaping or air from entering the kettle through the opening. When the oil is heated to the desired temperature in the kettle, the gum in the chamber may be dumped by the simple expedient of lifting the counterweight 61.

As hereinbefore stated, the apparatus is also eminently adapted for treating vegetable oils, such as linseed oil, Chinawood oil, perilla oil and the like. The condenser and the exhauster are employed first for removing some of the vapors and, second, for removing and/or reclaiming some of the fatty acid in the oil during the final stages of the treatment to reduce the acid number. When the apparatus is thus used, a charge of oil may be introduced through the inlet pipe 50 from one or both of the valved pipes 64 and 65 connected to a manifold or header 66 to which the conduit 50 is connected. Two such pipes are shown, so that different kinds of oils may be introduced through them.

To preheat the cold or unprocessed oil, a charge of hot, treated oil is delivered to a heat exchanger in the form of a tank 67 having a heat exchanging coil 68 and vapor outlet vent or stack 69. The treated oil from the kettle passes into the tank through a valved conduit 70 near the bottom and a branch 71 is also connected to this conduit so that the treated oil may be drained out for storage purposes after it is cooled. Before the hot oil is introduced into the preheater tank, it is desirable to admit an inert gas, such as carbon dioxide, into the tank to displace the air. To this end, a pipe 72 is connected to the bottom portion of the tank 67 so that the carbon dioxide will displace the air upwardly. The hot oil is introduced into the bottom of tank 67, through inlet 70 so that carbon dioxide is displaced upwardly through the vapor stack 67. This protects the surface of the oil from the discoloring effects of the air. After the kettle is empty, a charge of cold oil is introduced and absorbs some heat from the kettle. Then it is pumped out by the pump 47 through a valved branch conduit 73 connected to the heat exchanging coil 68 and back to the kettle through a conduit 74 and the conduit 50 through the two-way valve 52. This is continued until the temperature of the new charge in the kettle is about the same as that of the cooled oil in the preheater.

When the charge of oil in the kettle has been preheated, as described, the valves in the outlet and inlet conduits are closed and the charge is heated electrically, as described in the aforesaid copending application. During the preliminary stages, the two-way valve in the vapor conduit 27 is turned so that it communicates with the bleeder conduit 28 leading to the float chamber 26. Carbon dioxide is introduced in the kettle and the pressure automatically maintained. A positive pressure is maintained in the kettle until the oil has been kept at the required temperature for the desired time, depending upon the desired viscosity. The water in the condenser 33 is emptied and the condenser is heated to approximately the same temperature as that of the oil in the kettle. Then the two-way valve 32 is opened to the condenser, closing the conduit 28, and the fan 30 is started. Since the condenser is heated to the same temperature as the oil, the vapor or fatty acid products of decomposition are prevented from condensing and pass out through the outlet of the exhauster fan. In some instances, the suction is applied for a period of about a half hour near the end of the bodying operation. However, this will depend upon the desired acid number which is determined by taking and testing samples during the progress of the treatment. If desired, the fatty acid may be reclaimed from the condenser. In that case, water is introduced in the condenser and the electrical heat cut off. The condensate will drain to the bottom of the condenser into the header 38 and may be drained out through the valved drain pipe 45 as fast as it accumulates so that it will not overflow the conduit 37 and flow back into the kettle.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. In combination with a closed heat treating kettle for polymerizing oils and for making synthetic resins and the like in the presence of an inert gas above the level of the charge, an outlet conduit connected to the top of the kettle having a bleeder pipe for the gas and vapor submerged in a liquid seal at its outlet end; a suction fan and a condenser having a pipe also connected to said outlet conduit; and valve means connected to open one pipe and to close the other pipe after polymerization begins, whereby volatile products of the chemical reaction may be removed.

2. In combination with a closed heat treating kettle for polymerizing oils and for making synthetic resins and the like, a conduit connected to the vapor space of the kettle; a reflux condenser connected to the conduit; suction means connected to the reflux condenser to remove vapors from the kettle through the condenser; heating means associated with the condenser; automatic temperature control means for the last named heating means to maintain the temperature of the cooling medium in the condenser substantially constant and at any predetermined temperature, whereby volatile products of the chemical reaction within the kettle may be removed in the form of vapor while the less volatile recovered products are returned to the kettle; a valve in the conduit below said condenser to cut off the vapor flow through the condenser; and a separate vapor outlet adapted to communicate with the kettle when said valve is closed.

3. In combination with a closed heat treating kettle for polymerizing oils and for making synthetic resins and the like, heating means for the kettle; automatic control means; means to supply inert gas to the kettle above the charge and maintain an atmosphere of inert gas within the kettle while the charge is being heated; a conduit connected to the top of the kettle and having a reflux condenser therein; an exhaust fan connected to the conduit to remove vapors from the kettle through the reflux condenser; an electrical heater on the outside of the reflux condenser to supply heat thereto; valved conduits to control the supply of cooling medium to the condenser; automatic means to control the temperature in the condenser whereby some of the volatile constituents of the vapors are removed through the condenser and other less volatile constituents are returned to the kettle; and manual means to cut off the flow of vapor through the condenser and permit it to discharge through a separate outlet.

4. In combination with a polymerizing kettle of the character described, a conduit connected to the vapor space of the kettle; a reflux condenser connected to the conduit; an exhaust fan connected to the conduit to withdraw vapors from the kettle through the condenser; external heating means associated with the condenser; temperature control means for the heating means connected to maintain the temperature of the condenser substantially constant, whereby some of the volatile constituents in the vapor may be removed while other constituents are condensed; valve means in the conduit to close the communication between the kettle and the container; and a valved outlet connected to the condenser so that some of the condensed constituents recovered by the condenser may be withdrawn.

JAMES C. HARRIS, Jr.
GEORGE SUTHERLAND.